United States Patent
Webb et al.

(10) Patent No.: US 11,879,375 B2
(45) Date of Patent: Jan. 23, 2024

(54) EXHAUST AFTER-TREATMENT IN HEAVY-DUTY MOTOR VEHICLES

(71) Applicant: PACCAR Inc, Bellevue, WA (US)

(72) Inventors: Cynthia Chaffin Webb, Sedro-Woolley, WA (US); John Lyle Lahti, Anacortes, WA (US); Charles Wayne Reinhardt Swart, Bellingham, WA (US)

(73) Assignee: PACCAR Inc, Bellevue, WA (US)

( * ) Notice: Subject to any disclaimer, the term of this patent is extended or adjusted under 35 U.S.C. 154(b) by 0 days.

(21) Appl. No.: 17/830,123

(22) Filed: Jun. 1, 2022

(65) Prior Publication Data

US 2023/0392532 A1    Dec. 7, 2023

(51) Int. Cl.
*F01N 3/20*  (2006.01)
*F01N 3/08*  (2006.01)

(52) U.S. Cl.
CPC ............ *F01N 3/208* (2013.01); *F01N 3/0807* (2013.01); *F01N 3/0814* (2013.01); *F01N 3/0871* (2013.01); *F01N 3/0885* (2013.01); *F01N 3/206* (2013.01); *F01N 3/2006* (2013.01); *F01N 3/2066* (2013.01); *F01N 2250/12* (2013.01); *F01N 2550/03* (2013.01); *F01N 2560/026* (2013.01); *F01N 2610/02* (2013.01); *F01N 2610/146* (2013.01); *F01N 2900/04* (2013.01);
(Continued)

(58) Field of Classification Search
CPC combination set(s) only.
See application file for complete search history.

(56) References Cited

U.S. PATENT DOCUMENTS

2011/0311420 A1* 12/2011 Perrin ................... F01N 3/208
                                                    422/107
2013/0199157 A1*  8/2013 Henry .................... F01N 9/00
                                                    60/287

(Continued)

FOREIGN PATENT DOCUMENTS

EP           2728136 A1    5/2014
WO    WO 2021104733 A1    6/2021

OTHER PUBLICATIONS

Aliramezani et al., "NOx sensor ammonia cross sensitivity analysis using a simplified physics based model," Proceedings of Combustion Institute, Spring Technical Meeting, University of Waterloo, Waterloo, Ontario, Canada, May 10-12, 2016. (6 pages).

(Continued)

*Primary Examiner* — Binh Q Tran
(74) *Attorney, Agent, or Firm* — Seed IP Law Group LLP

(57) ABSTRACT

Controlling exhaust after-treatment in a heavy-duty motor vehicle includes operating a diesel engine of a heavy-duty truck such that the diesel engine generates an exhaust gas flow that enters an exhaust after-treatment system of the heavy-duty truck, the exhaust after-treatment system including a selective catalytic reduction system, measuring a level of $NO_x$ gases in the exhaust gas flow downstream of the selective catalytic reduction system, and controlling a diesel exhaust fluid injector upstream of the selective catalytic reduction system to inject diesel exhaust fluid into the exhaust gas flow upstream of the selective catalytic reduction system at an injection rate that is based on the measured level of $NO_x$ gases.

9 Claims, 6 Drawing Sheets

(52) U.S. Cl.
    CPC ............... *F01N 2900/0412* (2013.01); *F01N 2900/1402* (2013.01); *F01N 2900/1614* (2013.01); *F01N 2900/1616* (2013.01); *F01N 2900/1621* (2013.01); *F01N 2900/1622* (2013.01)

(56) References Cited

U.S. PATENT DOCUMENTS

| | | | |
|---|---|---|---|
| 2015/0218993 A1* | 8/2015 | Chavannavar | F01N 3/208 422/111 |
| 2016/0109420 A1* | 4/2016 | Furui | G01N 33/0073 422/83 |
| 2016/0303509 A1* | 10/2016 | Itoh | B01D 53/9431 |
| 2018/0071681 A1* | 3/2018 | Miller | F01N 3/023 |
| 2018/0274418 A1* | 9/2018 | Edwards | F01N 11/00 |

OTHER PUBLICATIONS

Carstens et al., "NOx Sensors," revised Dec. 2019, DieselNet Technology Guide, EcoPoint, Inc., URL=https://dieselnet.com/tech/sensors_nox.php, download date Aug. 15, 2022. (6 pages).

* cited by examiner

EXHAUST AFTER-TREATMENT IN HEAVY-DUTY MOTOR VEHICLES

BACKGROUND

Technical Field

The present disclosure relates generally to control of selective catalytic reduction in heavy-duty motor vehicle engines and, more specifically, to closed-loop control of DEF dosing in selective catalytic reduction systems in heavy-duty motor vehicle exhaust after-treatment systems.

Description of the Related Art

Regulated emissions from today's heavy-duty engines demand very low levels of tailpipe emissions, and standards are expected to be further reduced in the near future. To reduce tailpipe exhaust emissions, current technologies rely on aggressive engine control strategies and exhaust after-treatment catalyst systems (catalyst systems used to treat engine exhaust are referred to herein as exhaust after-treatment systems, emissions after-treatment systems, or EAS). The EAS for a typical heavy-duty diesel or other lean-burning engine may include a diesel oxidation catalyst (DOC) to oxidize unburned fuel and carbon monoxide, a diesel particulate filter (DPF) for control of particulate matter (PM), selective catalytic reduction (SCR) systems for reduction of oxides of nitrogen ($NO_x$, including at least NO and $NO_2$), and/or an ammonia oxidation catalyst (AMOX). Performance of EAS systems, and of SCR systems in particular, is dependent upon exhaust gas temperature and other parameters.

SCR processes use catalysts to catalyze the $NO_x$ reduction and a fluid referred to as DEF (diesel exhaust fluid), which acts as a $NO_x$ reductant over the SCR catalyst. DEF is an aqueous solution that evaporates and decomposes to chemically release ammonia so that the ammonia is available for reaction. Efficiency of SCR operation is dependent upon temperature. For example, DEF evaporation and decomposition is dependent upon temperature, with higher temperatures generally improving performance. Temperature levels required to ensure compliance with emissions regulations may be highly dependent upon a wide variety of variables and are in some cases determined experimentally for specific engines, trucks, and operating conditions thereof. Thus, an EAS may include a heater to increase the temperature of the exhaust, to facilitate DEF injection, evaporation, and decomposition at rates sufficient to allow efficient performance of the SCR processes.

BRIEF SUMMARY

A method may be summarized as comprising: operating a diesel engine of a heavy-duty truck such that the diesel engine generates an exhaust gas flow that enters an exhaust after-treatment system of the heavy-duty truck, the exhaust after-treatment system including a selective catalytic reduction system; measuring a level of $NO_x$ gases in the exhaust gas flow downstream of the selective catalytic reduction system; and controlling a diesel exhaust fluid injector upstream of the selective catalytic reduction system to inject diesel exhaust fluid into the exhaust gas flow upstream of the selective catalytic reduction system at an injection rate that is based on the measured level of $NO_x$ gases.

The selective catalytic reduction system may be an underbody selective catalytic reduction system or a close-coupled selective catalytic reduction system where the injection rate is further based on a temperature of an underbody selective catalytic reduction system.

The selective catalytic reduction system may be an upstream selective catalytic reduction system, the diesel exhaust fluid injector may be a first diesel exhaust fluid injector, and the method may further comprise: measuring a level of $NO_x$ gases in the exhaust gas flow downstream of a downstream selective catalytic reduction system; and controlling a second diesel exhaust fluid injector downstream of the upstream selective catalytic reduction system and upstream of the downstream selective catalytic reduction system to inject diesel exhaust fluid into the exhaust gas flow downstream of the upstream selective catalytic reduction system and upstream of the downstream selective catalytic reduction system at an injection rate that is based on the measured level of $NO_x$ gases in the exhaust gas flow downstream of the downstream selective catalytic reduction system.

The method may further comprise: determining whether ammonia slip is occurring at the selective catalytic reduction system; and adjusting the injection rate based on whether ammonia slip is occurring at the selective catalytic reduction system. Determining whether ammonia slip is occurring may include: adjusting the injection rate, thereby changing an ammonia-to-$NO_x$ ratio at the selective catalytic reduction system; measuring first levels of $NO_x$ gases in the exhaust gas flow upstream of the selective catalytic reduction system and second levels of $NO_x$ gases in the exhaust gas flow downstream of the selective catalytic reduction system as the ammonia-to-$NO_x$ ratio at the selective catalytic reduction system changes; determining a measured efficiency of the selective catalytic reduction system based on the measured first and second levels of $NO_x$ gases; and determining whether the measured efficiency is positively or negatively correlated with the changing ammonia-to-$NO_x$ ratio. The method may further comprise, if it is concluded that ammonia slip is not occurring and the measured efficiency is less than a target efficiency, then increasing the injection rate, if it is concluded that ammonia slip is not occurring and the measured efficiency is greater than the target efficiency, then decreasing the injection rate, and, if it is concluded that ammonia slip is occurring, then decreasing the injection rate.

A method may be summarized as comprising: injecting diesel exhaust fluid into an exhaust after-treatment system upstream of a selective catalytic reduction system at an injection rate; measuring a $NO_x$ level downstream of the selective catalytic reduction system; and adjusting the injection rate based on the measured $NO_x$ level.

The selective catalytic reduction system may be an underbody selective catalytic reduction system or a close-coupled selective catalytic reduction system where the injection rate is further based on a temperature of an underbody selective catalytic reduction system.

The selective catalytic reduction system may be an upstream selective catalytic reduction system, the injection rate may be a first injection rate, and the method may further comprise: injecting diesel exhaust fluid into the exhaust after-treatment system downstream of the upstream selective catalytic reduction system and upstream of a downstream selective catalytic reduction system at a second injection rate; measuring a $NO_x$ level downstream of the downstream selective catalytic reduction system; and adjusting the second injection rate based on the measured $NO_x$ level downstream of the downstream selective catalytic reduction system.

The method may further comprise: determining whether ammonia slip is occurring at the selective catalytic reduction system; and adjusting the injection rate based on whether ammonia slip is occurring at the selective catalytic reduction system. Determining whether ammonia slip is occurring may include: adjusting the injection rate, thereby changing an ammonia-to-$NO_x$ ratio at the selective catalytic reduction system; measuring first levels of $NO_x$ gases in the exhaust gas flow upstream of the selective catalytic reduction system and second levels of $NO_x$ gases in the exhaust gas flow downstream of the selective catalytic reduction system as the ammonia-to-$NO_x$ ratio at the selective catalytic reduction system changes; determining a measured efficiency of the selective catalytic reduction system based on the measured first and second levels of $NO_x$ gases; and determining whether the measured efficiency is positively or negatively correlated with the changing ammonia-to-$NO_x$ ratio. The method may further comprise, if it is concluded that ammonia slip is not occurring and the measured efficiency is less than a target efficiency, then increasing the injection rate, if it is concluded that ammonia slip is not occurring and the measured efficiency is greater than the target efficiency, then decreasing the injection rate, and, if it is concluded that ammonia slip is occurring, then decreasing the injection rate.

A heavy-duty truck may be summarized as comprising: a diesel engine; an exhaust after-treatment system having an upstream end and a downstream end opposite the upstream end, the upstream end coupled to the diesel engine, the exhaust after-treatment system including a selective catalytic reduction system; and an electronic control unit configured to: operate the diesel engine such that the diesel engine generates an exhaust gas flow that enters the exhaust after-treatment system; record a measurement of a level of $NO_x$ gases in the exhaust gas flow downstream of the selective catalytic reduction system; and control a diesel exhaust fluid injector upstream of the selective catalytic reduction system to inject diesel exhaust fluid into the exhaust gas flow upstream of the selective catalytic reduction system at an injection rate that is based on the measured level of $NO_x$ gases.

The electronic control unit may be further configured to: determine whether ammonia slip is occurring at the selective catalytic reduction system; and adjust the injection rate based on whether ammonia slip is occurring at the selective catalytic reduction system. To determine whether ammonia slip is occurring, the electronic control unit may be further configured to: adjust the injection rate, thereby changing an ammonia-to-$NO_x$ ratio at the selective catalytic reduction system; record measurements of first levels of $NO_x$ gases in the exhaust gas flow upstream of the selective catalytic reduction system and second levels of $NO_x$ gases in the exhaust gas flow downstream of the selective catalytic reduction system as the ammonia-to-$NO_x$ ratio at the selective catalytic reduction system changes; determine a measured efficiency of the selective catalytic reduction system based on the measured first and second levels of $NO_x$ gases; and determine whether the measured efficiency is positively or negatively correlated with the changing ammonia-to-$NO_x$ ratio. The electronic control unit may be further configured to: if it is concluded that ammonia slip is not occurring and the measured efficiency is less than a target efficiency, then increase the injection rate, if it is concluded that ammonia slip is not occurring and the measured efficiency is greater than the target efficiency, then decrease the injection rate, and, if it is concluded that ammonia slip is occurring, then decrease the injection rate.

DETAILED DESCRIPTION

Figure 1:
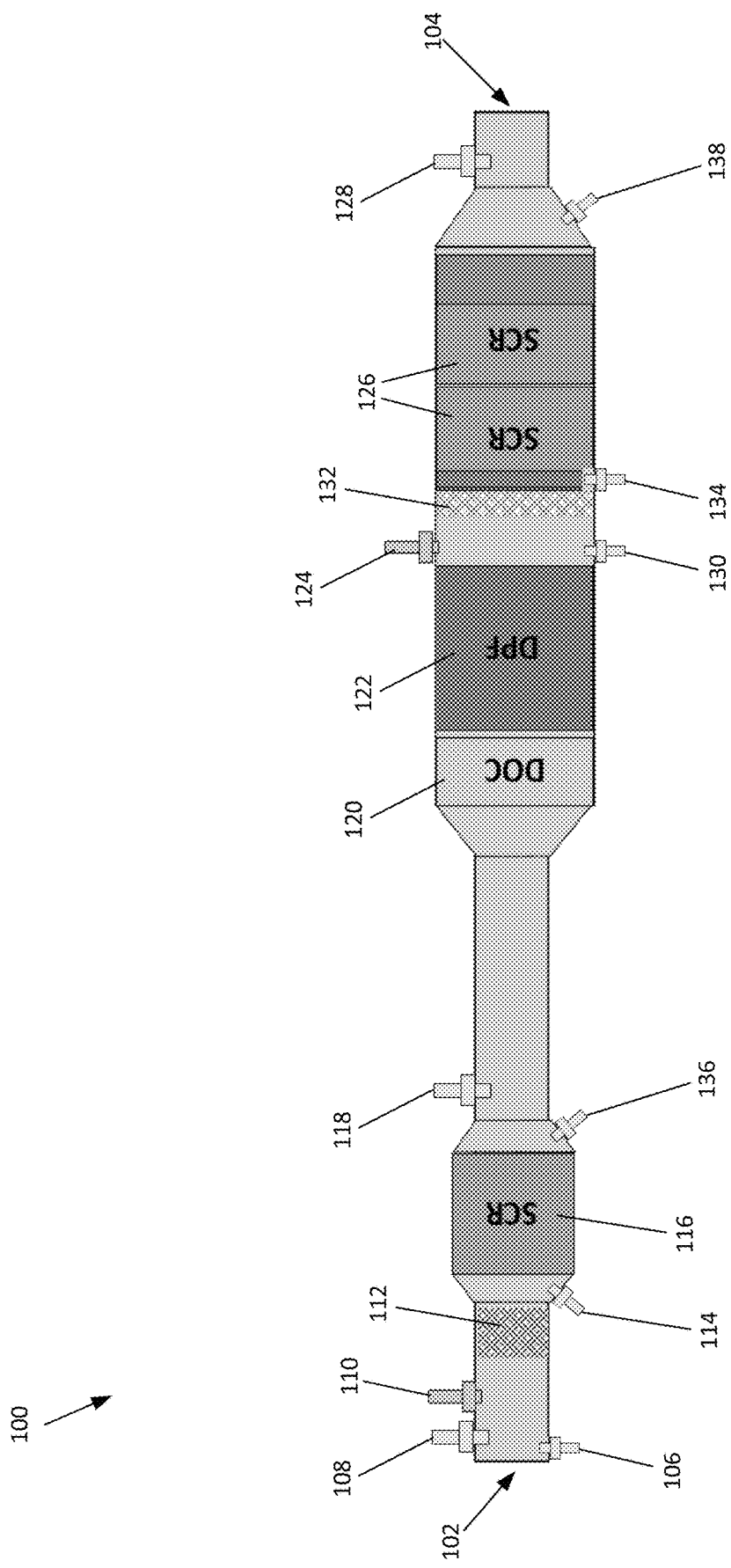
FIG. 1 illustrates a diagram of an exhaust after-treatment system including a DOC, a DPF, and dual SCR systems.

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with the technology have not been shown or described in detail to avoid unnecessarily obscuring descriptions of the embodiments.

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments. Also, as used in this specification and the appended claims, the singular forms "a," "an," and "the" include plural referents unless the context clearly dictates otherwise. It should also be noted that the term "or" is generally employed in its sense including "and/or" unless the context clearly dictates otherwise.

The use of ordinals such as first, second and third does not necessarily imply a ranked sense of order, but rather may only distinguish between multiple instances of an act or structure.

Terms of geometric alignment may be used herein. Any components of the embodiments that are illustrated, described, or claimed herein as being aligned, arranged in the same direction, parallel, or having other similar geometric relationships with respect to one another have such relationships in the illustrated, described, or claimed embodiments. In alternative embodiments, however, such components can have any of the other similar geometric properties described herein indicating alignment with respect to one another. Any components of the embodiments that are illustrated, described, or claimed herein as being not aligned, arranged in different directions, not parallel, perpendicular, transverse, or having other similar geometric relationships with respect to one another, have such relationships in the illustrated, described, or claimed embodiments. In alternative embodiments, however, such components can have any of the other similar geometric properties described herein indicating non-alignment with respect to one another.

Various examples of suitable dimensions of components and other numerical values may be provided herein. In the illustrated, described, and claimed embodiments, such dimensions are accurate to within standard manufacturing tolerances unless stated otherwise. Such dimensions are examples, however, and can be modified to produce variations of the components and systems described herein. In various alternative embodiments, such dimensions and any other specific numerical values provided herein can be approximations wherein the actual numerical values can vary by up to 1, 2, 5, 10, 15 or more percent from the stated, approximate dimensions or other numerical values.

Traditionally, heavy-duty vehicles included many components of exhaust after-treatment systems "underbody," that is, underneath the engine, cab, or another portion of the vehicle, where space is relatively freely available and these components can therefore generally be larger than would otherwise be practical. Some modern heavy-duty vehicles, however, have begun to include a "close-coupled," "up-close," or "light-off" SCR unit much closer to the engine and exhaust ports thereof (e.g., adjacent to a turbine outlet of a turbocharger) and upstream of the traditional underbody exhaust after-treatment system, which can provide certain advantages in that the temperature of the engine exhaust may be higher when it is closer to the engine, although locating an SCR unit nearer the engine limits the available space and thus its practical size. Thus, some modern heavy-duty vehicles have included both a "close-coupled" SCR unit upstream with respect to the flow of the exhaust, such as adjacent to a turbine outlet of a turbocharger, to take advantage of the higher exhaust temperatures, as well as an "underbody" SCR unit downstream with respect to the flow of the exhaust, such as under the engine or cab of the vehicle, to take advantage of the greater available space.

FIG. 1 illustrates a diagram of an exhaust after-treatment system 100 that has a first, upstream end 102 and a second, downstream end 104 opposite to the first, upstream end 102. The exhaust after-treatment system 100 is a component of a vehicle, such as a large, heavy-duty, diesel truck, and in use carries exhaust from the diesel engine of the truck to a tailpipe of the truck. For example, the first, upstream end 102 of the exhaust after-treatment system 100 may be coupled directly to an exhaust port or an outlet port of the diesel engine, such as a turbine outlet of a turbocharger thereof, and the second, downstream end 104 may be coupled directly to an inlet port of a tailpipe or muffler of the truck. Thus, when the engine is running and generating exhaust, the exhaust travels along the length of the exhaust after-treatment system 100 from the first, upstream end 102 thereof to the second, downstream end 104 thereof.

As illustrated in FIG. 1, the exhaust after-treatment system 100 includes, at its first, upstream end 102, or proximate or adjacent thereto, a first temperature sensor 106, which may be a thermocouple, to measure the temperature of the exhaust gas flow as it leaves the engine and enters the exhaust after-treatment system 100, before heat begins to be lost through the exhaust after-treatment system 100 to the environment. The exhaust after-treatment system 100 also includes, at its first, upstream end 102, or proximate or adjacent thereto, or just downstream of the first temperature sensor 106, a first $NO_x$ sensor 108, to measure the content of $NO_x$ gases in the exhaust gas flow as it leaves the engine and enters the exhaust after-treatment system 100. The exhaust after-treatment system 100 also includes, at its first, upstream end 102, or proximate or adjacent thereto, or just downstream of the first $NO_x$ sensor 108, a first DEF injector 110, to inject DEF into the exhaust gas flow as it leaves the engine and enters the exhaust after-treatment system 100.

The exhaust after-treatment system 100 may also include, proximate or adjacent its first, upstream end 102, or just downstream of the first DEF injector 110, a first heater 112, which may be an electrically-powered resistive heater or heating element, a burner, or any other suitable heater, to inject heat energy into the exhaust gas flow and the injected DEF as they flow through the exhaust after-treatment system 100. The exhaust after-treatment system 100 also includes, just downstream of the first heater 112, a second temperature sensor 114, which may be a thermocouple, to measure the temperature of the exhaust gas flow as it leaves the first heater 112 and just before or just as it enters a first, close-coupled SCR system 116, or at the inlet to the close-coupled SCR system 116. The exhaust after-treatment system 100 also includes, just downstream of the first heater 112 and the second temperature sensor 114, the first, close-coupled SCR system 116, which is configured to reduce oxides of nitrogen ($NO_x$) in the exhaust gas flow.

The exhaust after-treatment system 100 also includes, just downstream of the first SCR system 116, a third temperature sensor 136, which may be a thermocouple, to measure the temperature of the exhaust gas flow as it leaves the first SCR system 116. In some implementations, the second temperature sensor 114 and the third temperature sensor 136 may be collectively referred to as an SCR bed temperature sensor. For example, a temperature of a catalytic bed of the first, close-coupled SCR system 116 may be measured, calculated, estimated, or otherwise determined based on the measurements provided by the second temperature sensor 114 and the third temperature sensor 136, such as by averaging the temperature measurements provided by the second temperature sensor 114 and the third temperature sensor 136.

The exhaust after-treatment system 100 also includes, just downstream of the first SCR system 116 and/or the third temperature sensor 136, a second $NO_x$ sensor 118, to measure the content of $NO_x$ gases in the exhaust gas flow as it leaves the first SCR system 116. In practice, the first $NO_x$ sensor 108 and the second $NO_x$ sensor 118 can be used together to monitor, assess, or measure the performance of the first SCR system 116. Together, the first temperature sensor 106, the first $NO_x$ sensor 108, the first DEF injector 110, the first heater 112, the second temperature sensor 114, the first, close-coupled SCR system 116, the third temperature sensor 136, and the second $NO_x$ sensor 118 can be referred to as a close-coupled portion of the exhaust after-treatment system 100, as they can be collectively located at or adjacent to the engine of the vehicle.

The exhaust after-treatment system 100 also includes, downstream of the first SCR system 116, the third temperature sensor 136, and the second $NO_x$ sensor 118, a DOC component 120, to oxidize unburned fuel and carbon monoxide in the exhaust gas flow. The exhaust after-treatment system 100 also includes, downstream of the DOC component 120, a DPF 122, to reduce or otherwise control particulate matter in the exhaust gas flow. The exhaust after-treatment system 100 also includes, downstream of the DPF 122, a fourth temperature sensor 130, which may be a thermocouple, to measure the temperature of the exhaust gas flow as it leaves the DPF 122. The exhaust after-treatment system 100 also includes, downstream of the DPF 122, or just downstream of the fourth temperature sensor 130, a second DEF injector 124, to inject DEF into the exhaust gas flow as it leaves the DPF 122.

In some embodiments, the exhaust after-treatment system 100 may also include, just downstream of the fourth temperature sensor 130 and the second DEF injector 124, a mixer 132 and a second heater, which may be an electrically-powered resistive heater or heating element, a burner, or any other suitable heater, to inject heat energy into the exhaust gas flow and the injected DEF as they flow through the exhaust after-treatment system 100. The exhaust after-treatment system 100 also includes, just downstream of the mixer 132 and the second heater, a fifth temperature sensor 134, which may be a thermocouple, to measure the temperature of the exhaust gas flow as it leaves the second heater and just before or just as it enters a second, underbody SCR system 126, or at the inlet to the underbody SCR system 126. The exhaust after-treatment system 100 also includes, just downstream of the mixer 132, the second heater, and the fifth temperature sensor 134, the second, underbody SCR system 126, which is configured to reduce oxides of nitrogen ($NO_x$) in the exhaust gas flow.

The exhaust after-treatment system 100 also includes, just downstream of the second SCR system 126, a sixth temperature sensor 138, which may be a thermocouple, to measure the temperature of the exhaust gas flow as it leaves the second SCR system 126. In some implementations, the fifth temperature sensor 134 and the sixth temperature sensor 138 may be collectively referred to as an SCR bed temperature sensor. For example, a temperature of a catalytic bed of the second, underbody SCR system 126 may be measured, calculated, estimated, or otherwise determined based on the measurements provided by the fifth temperature sensor 134 and the sixth temperature sensor 138, such as by averaging the temperature measurements provided by the fifth temperature sensor 134 and the sixth temperature sensor 138.

In some alternative embodiments, the exhaust after-treatment system 100 may not include the second heater and may include only a single heater, i.e., the first heater 112, to reduce overall costs. Similarly, in some embodiments, the exhaust after-treatment system 100 may not include all of the temperature sensors described herein, such as the third temperature sensor 136, fourth temperature sensor 130, fifth temperature sensor 134, and/or sixth temperature sensor 138, such as to further reduce overall costs. In such implementations, such temperature sensors may be replaced by virtual temperature sensors, which may measure, calculate, estimate, simulate, or otherwise determine a temperature at the same location, such as based on equations, data, simulations, and/or models of the behavior of temperatures at such locations under the operating conditions of the systems described herein.

The exhaust after-treatment system 100 also includes, just downstream of the second SCR system 126 and/or the sixth temperature sensor 138, and at its second, downstream end 104, or proximate or adjacent thereto, a third $NO_x$ sensor 128, to measure the content of $NO_x$ gases in the exhaust gas flow as it leaves the second SCR system 126. In practice, the second $NO_x$ sensor 118 and the third $NO_x$ sensor 128 can be used together to monitor, assess, or measure the performance of the second SCR system 126. Together, the DOC component 120, the DPF 122, the second DEF injector 124, the fourth temperature sensor 130, the mixer 132, the second heater, the fifth temperature sensor 134, the second SCR system 126, the sixth temperature sensor 138, and the third $NO_x$ sensor 128 can be referred to as an underbody portion of the exhaust after-treatment system 100, as they can be collectively located underneath the engine, cab, or another portion of the vehicle.

In general, performance of an SCR system at a given time can be assessed in terms of its conversion efficiency, which may be referred to as "efficiency," and which may be measured as a percentage by which the SCR system reduces the quantity of $NO_x$ gases (e.g., as measured by $NO_x$ sensors as described herein) in an exhaust gas flow. An efficiency of an SCR system at a given time may be calculated based on a first measurement of the content of $NO_x$ gases in the exhaust gas flow just upstream of, or at an inlet of, the SCR system, and a second measurement of the content of $NO_x$ gases in the exhaust gas flow just downstream of, or at an outlet of, the SCR system. In particular, an efficiency can be calculated as the ratio of the difference between the first measurement and the second measurement to the first measurement. Thus, in the system 100, the efficiency of the first, close-coupled SCR system 116 can be calculated as the ratio of the difference between the measurement provided by the second $NO_x$ sensor 118 and the measurement provided by the first $NO_x$ sensor 108 to the measurement provided by the first $NO_x$ sensor 108. Similarly, in the system 100, the efficiency of the second, underbody SCR system 126 can be calculated as the ratio of the difference between the measurement provided by the third $NO_x$ sensor 128 and the measurement provided by the second $NO_x$ sensor 118 to the measurement provided by the second $NO_x$ sensor 118.

DEF is used to provide ammonia that reacts with $NO_x$ gases in an exhaust gas flow within SCR systems to form water and nitrogen ($N_2$). In general, a $NO_x$ sensor upstream of an SCR system can measure a $NO_x$ concentration in the exhaust gas flow as it enters the SCR system, and such a measurement can be used to control the amount of DEF injected into the exhaust gas flow. In some cases, a rate at which DEF is injected can be selected to achieve a target ammonia-to-$NO_x$ ratio (ANR) within the SCR system. For example, the rate at which DEF is injected into the exhaust gas flow can be controlled to optimize performance of the SCR system (e.g., to achieve a high, maximum, or near-maximum SCR efficiency, which may be less than 100% for a variety of reasons, including wear of components, and which may depend on SCR bed temperature). In particular, the rate at which DEF is injected into the exhaust gas flow can be controlled to facilitate operation of the SCR system at an efficiency within a range having a lower bound of 85%, 86%, 87%, 88%, 89%, 90%, 91%, 92%, 93%, 94%, 95%, 96%, 97%, 98%, or 99% and/or having an upper bound of 86%, 87%, 88%, 89%, 90%, 91%, 92%, 93%, 94%, 95%, 96%, 97%, 98%, 99%, or 100%. In some particular embodiments, the rate at which DEF is injected into the exhaust gas flow can be controlled such that the SCR system operates at an efficiency of between 90% and 100%. In some implementations, as the measured $NO_x$ concentration upstream of an SCR system increases, the rate at which DEF is injected is increased so that additional ammonia is available for reaction with the $NO_x$ gases within the SCR system, and as the measured $NO_x$ concentration upstream of the SCR system decreases, the rate at which DEF is injected is decreased to avoid wasting DEF.

If DEF is injected into the exhaust gas flow at an excessive rate, then excess, unreacted ammonia can pass through the SCR system and the rest of the exhaust after-treatment system and into the environment as a component of the vehicle's emissions. This can be referred to as "ammonia slip," and can be problematic for a variety of reasons, including because it represents a waste in resources, an unnecessary expense, and an additional component of tailpipe emissions, and because it can lead to formation of deposits in the exhaust after-treatment system and promote corrosion. Thus, it is important and valuable to be able to calculate and control DEF injection rates precisely and accurately. If the DEF injection rate is too low, then there may not be sufficient ammonia available in the SCR system to react with the $NO_x$ gases and bring $NO_x$ levels down to regulated levels. On the other hand, if the DEF injection rate is too high, then there may be excess ammonia available in the SCR system, resulting in ammonia slip. In some previous exhaust after-treatment systems, where a $NO_x$ sensor upstream of an SCR system measures the $NO_x$ concentration in the exhaust gas flow as it enters the SCR system, and this measurement is used to control the amount of DEF injected into the exhaust gas flow, actual DEF injection rates have in practice been lower than optimal for achieving high, maximum, or near-maximum SCR efficiencies. This has been done, in some cases, because fluctuations in injector performance, sensor performance, and/or SCR performance, among other factors, leads to inherent uncertainty regarding appropriate DEF injection rates, and because, in some cases, it is preferable to avoid ammonia slip even if it reduces SCR efficiency to some degree. As one specific example, if a theoretical maximum efficiency of an SCR system having a given bed temperature is 95%, then it may be optimal to inject DEF at a rate that provides an ANR expected to result in an efficiency of 95%, but in practice, some previous exhaust after-treatment systems would intentionally inject DEF at a lower rate to avoid ammonia slip or to reduce the chance of ammonia slip occurring given the inherent uncertainties.

The exhaust after-treatment system 100 includes a first, close-coupled SCR system 116 and a second $NO_x$ sensor 118 directly downstream thereof to measure the content of $NO_x$ gases in the exhaust gas flow as it leaves the first SCR system 116, as well as a second, underbody SCR system 126 and a third $NO_x$ sensor 128 directly downstream thereof to measure the content of $NO_x$ gases in the exhaust gas flow as it leaves the second SCR system 126. Thus, measurements provided by the second and third $NO_x$ sensors 118 and 128 can be used to calculate measured efficiencies in the SCR systems 116 and 126, which can be used to provide closed-loop (and more precise) control of DEF dosing in the SCR systems 116 and 126, thereby preventing over-dosing and under-dosing of DEF. Of particular value is the ability to prevent over-dosing of DEF and resulting ammonia slip, which allows higher baseline levels of DEF dosing in normal operation, thereby improving overall SCR efficiencies and performance and facilitating efficiencies more closely approximating theoretical maximum efficiencies.

Implementing such closed-loop control of DEF dosing encounters difficulties resulting from the fact that conventional $NO_x$ sensors do not and/or cannot distinguish between $NO_x$ and ammonia. For example, a conventional $NO_x$ sensor may be an amperometric sensor with two or three electrochemical cells adjacent to one another, where a first one of the electrochemical cells pumps oxygen gas ($O_2$) out of the gas being measured, and where a second one of the electrochemical cells performs a $NO_x$ measurement on the gas being measured in the absence of the oxygen gas. Additional information regarding such sensors and their sensitivity to ammonia can be found at: https://dieselnet.com/tech/sensors_nox.php and https://www.researchgate.net/publication/319069104_NOx_sensor_ammonia_cross_sensitivity_analysis_using_a_simplified_physics_based_model. Thus, if a conventional $NO_x$ sensor is providing measurements just downstream of an SCR system, e.g., at an outlet thereof, under conditions where ammonia slip is occurring, then the $NO_x$ sensor will not provide an accurate measurement of $NO_x$ levels in the exhaust gas flow. In particular, and exacerbating this problem, such measurements will indicate that $NO_x$ levels are higher than is really the case, potentially triggering DEF injection rates to increase, leading to increased ammonia slip and potentially causing a run-away cycle of increasing DEF injection. Specialized sensors that can measure ammonia independently of $NO_x$ gases are available, and could be used to address this difficulty, but they are more expensive and complex than is desired.

Figure 2A:
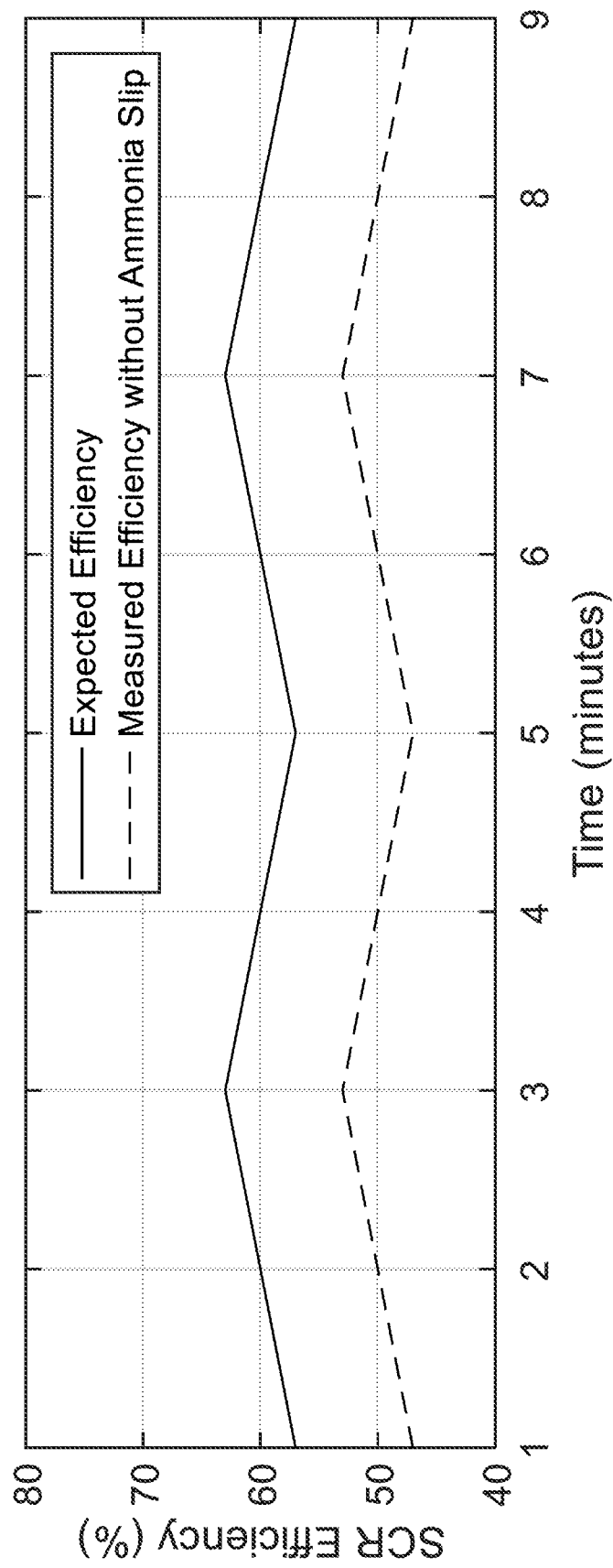
FIG. 2A is a chart illustrating expected and measured SCR efficiencies, as an ammonia-to-$NO_x$ ratio changes over time, when ammonia slip does not occur.

FIG. 2A illustrates expected and measured SCR efficiencies, as percentages, as an ammonia-to-$NO_x$ ratio (ANR) changes over time, when ammonia slip does not occur. In particular, FIG. 2A illustrates time in minutes on the x-axis (the ANR varies over time) and SCR efficiency in percent on the y-axis, and plots an expected efficiency in a solid line nearer the top of the chart and an actual efficiency as measured by $NO_x$ sensors at an inlet and an outlet of the SCR system in a broken line nearer the bottom of the chart and below the plot of the expected efficiency. This chart represents measurements under conditions where ammonia slip is not occurring, so the relationships between the expected efficiency and the measured efficiency are straightforward and as one might expect. They also illustrate the utility of the measurement of the actual efficiency, because it differs from (is less than) the expected efficiency. Thus, faced with the results plotted in FIG. 2A, an exhaust after-treatment system might increase an injection rate of DEF upstream of the SCR system, such as until the plot of the measured efficiency coincides with the plot of the expected efficiency or with a desired or target efficiency.

Figure 2B:
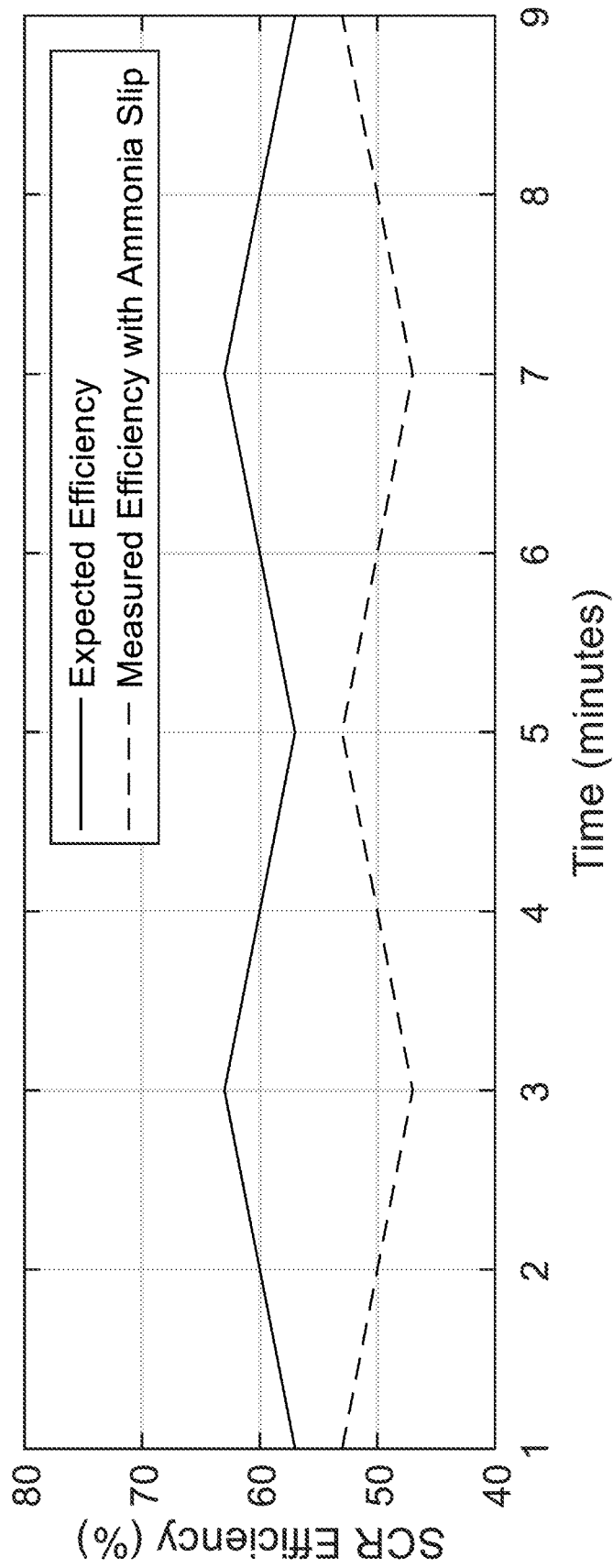
FIG. 2B is a chart illustrating expected and measured SCR efficiencies, as an ammonia-to-$NO_x$ ratio changes over time, when ammonia slip does occur.

FIG. 2B illustrates expected and measured SCR efficiencies, as percentages, as an ammonia-to-$NO_x$ ratio (ANR) changes over time, when ammonia slip does occur. In particular, FIG. 2B illustrates time in minutes on the x-axis (the ANR varies over time) and SCR efficiency in percent on the y-axis, and plots an expected efficiency in a solid line nearer the top of the chart and an actual efficiency as measured by $NO_x$ sensors at an inlet and an outlet of the SCR system in a broken line nearer the bottom of the chart and below the plot of the expected efficiency. This chart represents measurements under conditions where ammonia slip is occurring, so the relationships between the expected efficiency and the measured efficiency are not straightforward and not as one might expect—in fact, they are opposite one another, or mirror images across a horizontal line. They also illustrate, particularly in combination with the information illustrated in FIG. 2A, the difficulty in using conventional $NO_x$ sensors to assess SCR efficiency, because, without knowing whether ammonia slip is occurring, efficiencies measured by conventional $NO_x$ sensors can be unreliable.

Figure 3:
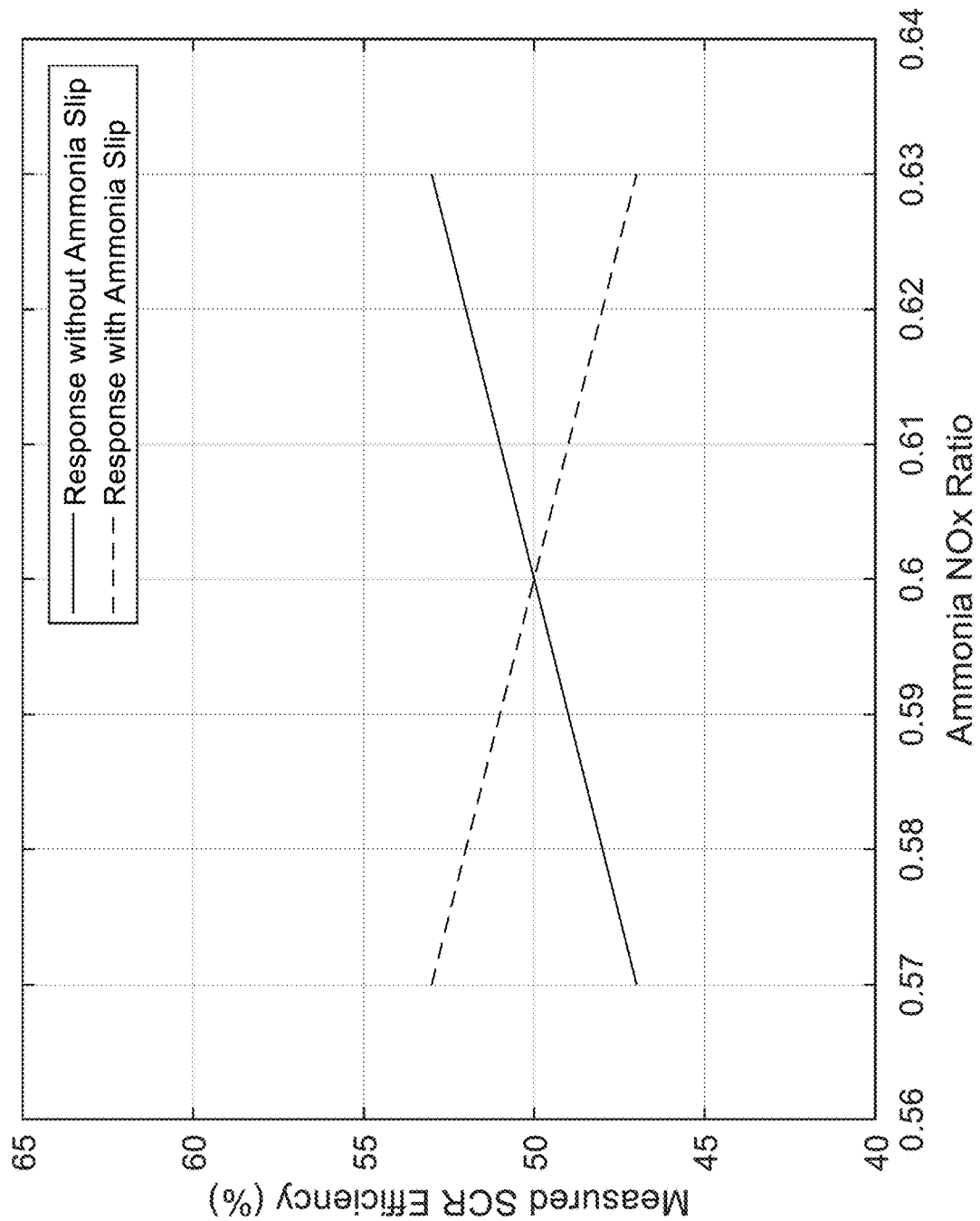
FIG. 3 is a chart illustrating measured SCR efficiencies as an ammonia-to-$NO_x$ ratio changes, when ammonia slip does and does not occur.

FIG. 3 illustrates measured SCR efficiencies, as percentages, as an ANR changes, both when ammonia slip does occur and when ammonia slip does not occur. In particular, FIG. 3 illustrates ANR on the x-axis and SCR efficiency in percent on the y-axis, and plots a first measured efficiency, in a solid line extending from the lower left to the upper right and having a positive slope, when ammonia slip is not occurring, and a second measured efficiency, in a broken line extending from the upper left to the lower right and having a negative slope, when ammonia slip is occurring. FIG. 3 reveals a straightforward way to use conventional $NO_x$ sensors, such as those in the exhaust after-treatment system 100, to determine whether ammonia slip is occurring. In particular, if a DEF injector is controlled to vary an ANR in an SCR system and the slope of the plot of the resulting SCR efficiency with ANR is positive (that is, if SCR efficiency is positively correlated with ANR), then it can be concluded that ammonia slip is not occurring, and if a DEF injector is controlled to vary an ANR in an SCR system and the slope of the plot of the resulting SCR efficiency with ANR is negative (that is, if SCR efficiency is negatively correlated with ANR), then it can be concluded that ammonia slip is occurring.

Figure 4:
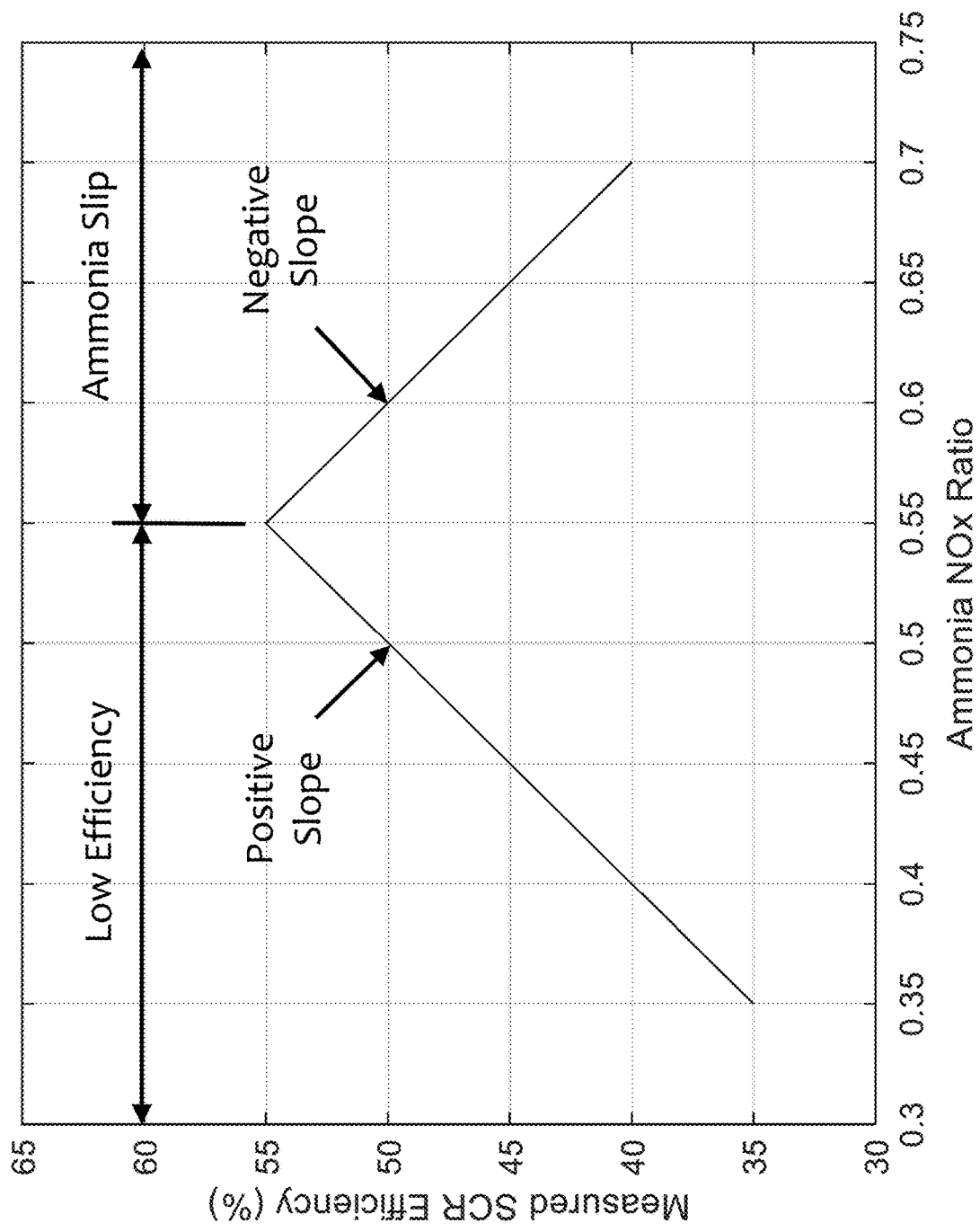
FIG. 4 is a chart illustrating measured SCR efficiency as an ammonia-to-$NO_x$ ratio changes, when ammonia slip does and does not occur.

FIG. 4 illustrates measured SCR efficiencies, as percentages, as an ANR changes, both when ammonia slip does occur and when ammonia slip does not occur. In particular, FIG. 4 illustrates ANR on the x-axis and SCR efficiency in percent on the y-axis, and plots a measured efficiency while it has a positive slope, extending from the bottom left to the top center, while ammonia slip is not occurring, and while it has a negative slope, extending from the top center to the bottom right, while ammonia slip is occurring. FIG. 4 illustrates that there is an optimal or target ANR at the transition between the positively-sloped portion of the plot and the negatively-sloped portion of the plot. When it is determined that ANR is less than such a target ANR, it may be concluded that efficiency is lower than optimal and a rate of DEF injection may be increased as a result, and when it is determined that ANR is greater than such a target ANR, it may be concluded that ammonia slip is occurring and a rate of DEF injection may be decreased as a result.

Figure 5:
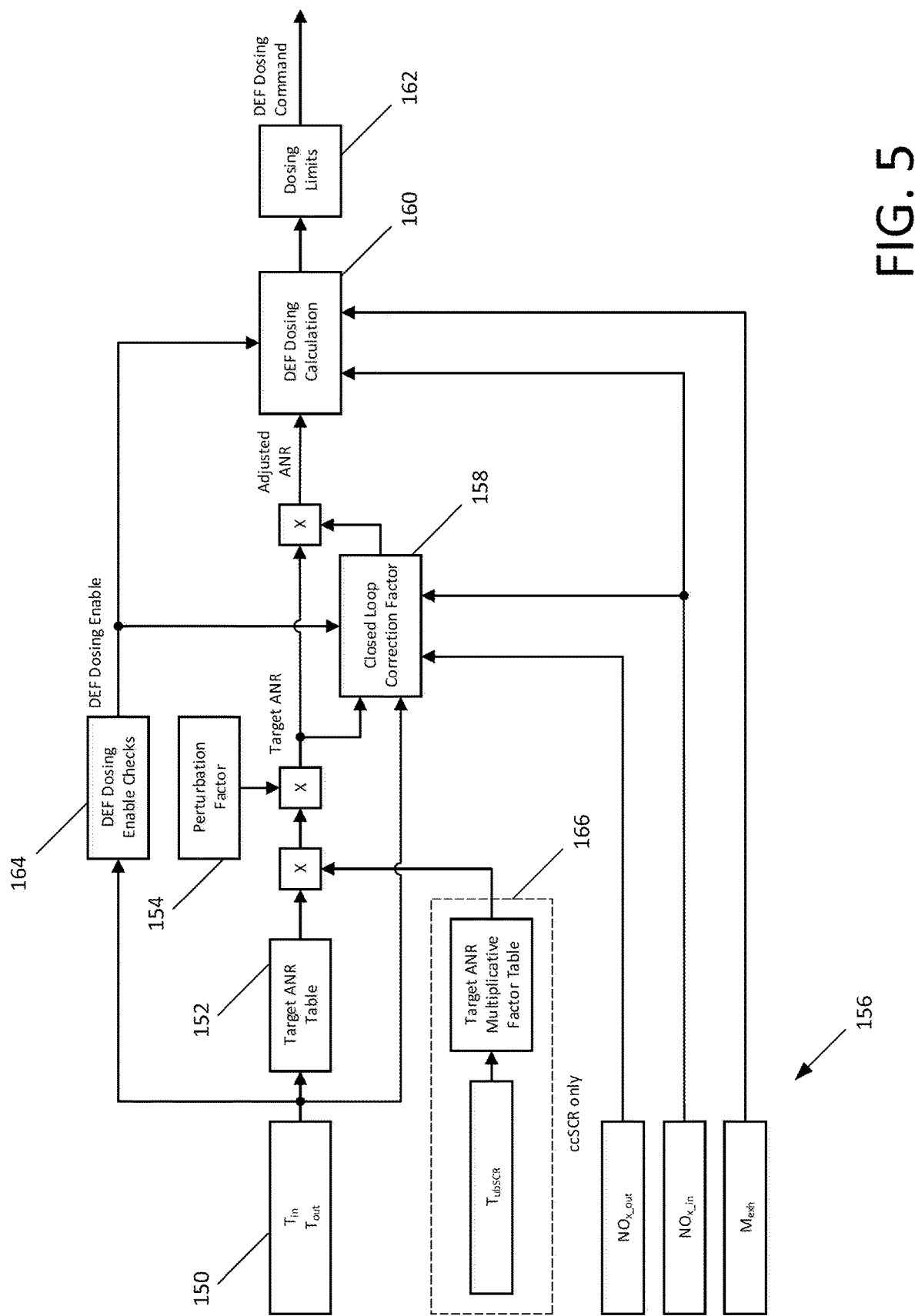
FIG. 5 is a diagram of techniques for controlling DEF dosing in an SCR system.

FIG. 5 is a diagram of techniques for controlling DEF dosing in an SCR system. For example, as illustrated at 150, a measurement $T_{in}$ of a temperature at an inlet to the SCR system (e.g., as measured by the second temperature sensor 114 for first SCR system 116 or by the fifth temperature sensor 134 for second SCR system 126) and a measurement $T_{out}$ of a temperature at an outlet to the SCR system (e.g., as measured by the third temperature sensor 136 for first SCR system 116 or by the sixth temperature sensor 138 for second SCR system 126) can be used as inputs to a "target ANR table" at 152. The target ANR table may be a lookup table unique to individual vehicle models and may have been compiled based on experiments run on each of the specific vehicle models. In some cases the measurements $T_{in}$ and $T_{out}$ are used directly as inputs to the table at 152, while in other cases these measurements can be used to calculate or estimate a temperature of a catalytic bed of the respective SCR system, and such a calculated or estimated temperature is then used directly as an input to the table at 152. In either case, the input(s) are used to look up a target ANR for the SCR system in the table at 152. At 154, a perturbation factor may be applied to the target ANR (e.g., the target ANR may be multiplied by the perturbation factor). For example, in some embodiments, the perturbation factor may be applied to the target ANR periodically to vary the target ANR, such that the target ANR increases slightly or decreases slightly over short periods of time. In some cases, such variation can occur regularly, such as every 2, 3, 4, 5, 6, 8, 10, or 15 seconds. In some implementations, the perturbation factor is above 1.0, such as 1.01, for a first period of time, and below 1.0, such as 0.99, for a second period of time, where the first and second periods of time alternate with one another. In some specific implementations, the first period of time may be the same as the second period of time, and either the first and/or the second period of time can be greater than 1 second and less than 10 seconds, such as 2, 3, 4, 5, 6, 7, 8, or 9 seconds.

As illustrated at 156, a measurement $NO_{x\_in}$ of a $NO_x$ level at an inlet to the SCR system (e.g., as measured by the first $NO_x$ sensor 108 for first SCR system 116 or by the second $NO_x$ sensor 118 for second SCR system 126, and which measurement may be taken over the last or trailing second of a first or second period of time as discussed with respect to the perturbation factor) and a measurement $NO_{x\_out}$ of a $NO_x$ level at an outlet to the SCR system (e.g., as measured by the second $NO_x$ sensor 118 for first SCR system 116 or by the third $NO_x$ sensor 128 for second SCR system 126, and which measurement may be taken over the last or trailing second of a first or second period of time as discussed with respect to the perturbation factor) can be used as inputs to determine a "closed-loop correction factor" at 158. In some cases the measurements $NO_{x\_in}$ and $NO_{x\_out}$, and/or the current ANR (e.g., an actual or measured ANR) can be used directly as inputs to the determination of the closed-loop correction factor at 158. In other cases the measurements $NO_{x\_in}$ and $NO_{x\_out}$ can be used to calculate or estimate an SCR system efficiency, and the calculated efficiency and/or the actual or measured ANR can be used directly as inputs to the determination of the closed-loop correction factor at 158.

In other cases time-series data collected for the calculated efficiency and the actual or measured ANR as the perturbation factor was used to vary the target ANR can be used to determine whether ammonia slip is occurring. For example, if it is determined based on the time series data that the calculated efficiency is positively correlated with the actual or measured ANR, then it can be concluded that ammonia slip is not occurring, and if it is determined based on the time series data that the calculated efficiency is negatively correlated with the actual or measured ANR, then it can be concluded that ammonia slip is occurring. If it is concluded that ammonia slip is not occurring and it is determined that an efficiency of the SCR system calculated based on the $NO_{x\_in}$ and $NO_{x\_out}$ measurements is less than a target efficiency, then the closed-loop correction factor can be used to determine an adjusted target ANR that is greater than the initial target ANR (e.g., the adjusted target ANR can be calculated by multiplying the initial target ANR by a closed-loop correction factor that is greater than 1, or the adjusted target ANR can be calculated by adding a closed-loop correction factor that is greater than 1 to the initial target ANR). If it is concluded that ammonia slip is not occurring and it is determined that an efficiency of the SCR system calculated based on the $NO_{x\_in}$ and $NO_{x\_out}$ measurements is greater than a target efficiency, then the closed-loop correction factor can be used to determine an adjusted target ANR that is less than the initial target ANR (e.g., the adjusted target ANR can be calculated by multiplying the initial target ANR by a closed-loop correction factor that is less than 1 or the adjusted target ANR can be calculated by adding a closed-loop correction factor that is less than 1 to the initial target ANR). If it is concluded that ammonia slip is occurring, then the closed-loop correction factor can be used to determine an adjusted target ANR that is less than the initial target ANR (e.g., the adjusted target ANR can be calculated by multiplying the initial target ANR by a closed-loop correction factor that is less than 1 or the adjusted target ANR can be calculated by adding a closed-loop correction factor that is less than 1 to the initial target ANR).

In some specific implementations, the closed-loop correction factor can be initially set to 1.00, and can be updated based on measurements made over time. For example, SCR bed temperatures can be periodically calculated as the average (e.g., mean) of measured temperatures at the inlet and the outlet of the SCR. Then, target efficiency can be periodically determined, such as by reference to a lookup table, based on the SCR bed temperature and the target ANR determined at 152. Next, measured efficiencies can be periodically calculated as the ratio of the difference between a measurement $NO_{x\_in}$ of a $NO_x$ level at an inlet to the SCR system and a measurement $NO_{x\_out}$ of a $NO_x$ level at an outlet to the SCR system to the measurement $NO_{x\_in}$ of the $NO_x$ level at the inlet to the SCR system, where such measurements are taken at the trailing end (e.g., trailing one second) of the time periods during which the perturbation factor is held constant. Efficiency errors can then be periodically calculated by subtracting the calculated measured efficiency from the determined target efficiency. In some implementations, an efficiency slope can be calculated by performing the previous steps repeatedly on time-series input data and then calculating a ratio of a first measured efficiency subtracted from a second, subsequent measured efficiency to a first target efficiency subtracted from a second, subsequent target efficiency. In other implementations, an efficiency slope can be calculated by performing the previous steps repeatedly on time-series input data and then calculating a ratio of a first measured efficiency subtracted from a second, subsequent measured efficiency to a first target ANR subtracted from a second, subsequent target ANR.

In either case, once the efficiency slope has been calculated, and if the calculated efficiency slope is greater than an upper threshold number, then the closed-loop correction factor can be increased, such as by an amount proportional to the efficiency error. In some alternative implementations, the closed-loop correction factor may be increased by a fixed, constant value, rather than by an amount proportional to the efficiency error. Additionally, in either case, once the efficiency slope has been calculated, and if the calculated efficiency slope is less than a lower threshold number, then the closed-loop correction factor can be decreased, such as by a fixed value. In some cases, such a fixed value may be greater than 0.00, 0.01, 0.02, 0.03, or 0.04, and/or less than 0.01, 0.02, 0.03, 0.04, or 0.05. In some alternative implementations, the closed-loop correction factor may be decreased by an amount proportional to the efficiency error rather than a fixed, constant value. Further, in either case, once the efficiency slope has been calculated, and if the calculated efficiency slope is less than the upper threshold number and greater than the lower threshold number, then the closed-loop correction factor can remain unchanged. In some implementations, the upper threshold number may be greater than 0.0, 0.1, 0.2, 0.3, or 0.4, and/or may be less than 0.6, 0.7, 0.8, 0.9, or 1.0. In some implementations, the lower threshold number may be less than 0.0, −0.1, −0.2, −0.3, or −0.4, and/or may be greater than −0.6, −0.7, −0.8, −0.9, or −1.0. In some cases, the upper threshold number may be opposite the lower threshold number.

Once a target ANR has been determined or an initial target ANR and an adjusted target ANR have been determined, such targets can be used to calculate a base DEF dosing level at 160. For example, the calculated DEF dosing level can be calculated to achieve the target ANR or adjusted target ANR in the SCR system, for example, based on any of the data discussed herein, including the measurement $NO_{x\_in}$ of a $NO_x$ level at an inlet to the SCR system, as well as a mass flow rate of the exhaust gas flow, $M_{exh}$. For example, a DEF volumetric flow rate to be injected into the exhaust gas flow can be calculated as the product of the exhaust mass flow rate, the molar ratio of $NO_x$ in the exhaust gas flow (which can be determined directly from the measurement of the $NO_x$ levels entering the SCR system), the target ANR or adjusted target ANR, and the molar mass of urea, divided by the molar mass of the exhaust, an ammonia to urea mole ratio (e.g., 2.0), the mass fraction of urea in DEF, and the density of the DEF.

Once a base DEF dosing level has been calculated at 160, DEF dosing limits can be applied at 162. For example, DEF dosing levels can be limited by minimum and maximum injection rates of the DEF injection hardware used. Once the DEF dosing limits have been applied, a DEF dosing command can be transmitted to a DEF injector, such as one of the DEF injectors 110 and 124. As illustrated at 164, some threshold DEF dosing checks may be performed, such as based on the $T_{in}$ and $T_{out}$ inputs. For example, in some embodiments, a check may be performed to ensure that an engine of the vehicle is running before any of the methods discussed herein are performed. As another example, the $T_{in}$ and $T_{out}$ inputs may be used to confirm that an SCR bed temperature is high enough to enable the SCR system to perform as intended before any of the methods discussed herein are performed.

FIG. 5 and all of the features described thus far for FIG. 5 may be applied to either a close-coupled SCR system, such as the first, close-coupled SCR system 116, and/or an underbody SCR system, such as the second, underbody SCR system 126. In the case of such features being applied to a close-coupled SCR system, such as the first, close-coupled SCR system 116, as illustrated at 166, a measured temperature of the catalytic bed of an underbody SCR system, such as the second, underbody SCR system 126, which may be determined based on temperature measurements provided by the fifth temperature sensor 134 and/or the sixth temperature sensor 138, may be used as an input to a "target ANR multiplicative factor table" at 166. The target ANR multiplicative factor table may be a lookup table unique to individual vehicle models and may have been compiled based on experiments run on each of the specific vehicle models. A multiplicative factor returned by the table based on the measured temperature of the underbody SCR system may be used to further adjust the target ANR (e.g., the target ANR may be multiplied by the multiplicative factor), such that performance of the close-coupled SCR system can be dependent upon temperatures at the underbody SCR system.

In practice, a close-coupled SCR system may have a certain efficiency at a given time, which may be controlled to optimize overall performance of the entire exhaust after-treatment system, and, whatever the efficiency of the close-coupled SCR system, the underbody SCR system may be used to reduce $NO_x$ levels to within levels in compliance with applicable emissions regulations. Thus, to the extent the perturbation factor applied at 154 affects efficiency of the close-coupled SCR system, the underbody SCR system can make up the difference. To the extent the perturbation factor applied at 154 affects efficiency of the underbody SCR system, on the other hand, the baseline efficiency of the underbody SCR system can be increased to compensate. It has been found that these effects can be quite small. For example, for an SCR system operating at a baseline efficiency of 95%, it has been found that application of the perturbation factor at 154 as described herein can lead to variation of the baseline efficiency from a low of 94% to a high of 96%. That is, the effect can be limited to within one percentage point in the efficiency, or about one percent of the baseline efficiency.

The exhaust after-treatment system 100 described herein includes the first, close-coupled SCR system 116 and the second, underbody SCR system 126. In general terms, the exhaust after-treatment system 100 has a first, upstream SCR system 116 and a second, downstream SCR system 126, where the upstream SCR system 116 is upstream of the downstream SCR system 126 and the downstream SCR system 126 is downstream of the upstream SCR system 116 with respect to the flow of exhaust through the exhaust after-treatment system 100.

In alternatives to the specific arrangement described with respect to FIG. 1, an exhaust after-treatment system can have all of the features of the exhaust after-treatment system 100, and perform in accordance with all of the methods described herein, except that both the upstream and the downstream SCR systems are close-coupled SCR systems. In such embodiments, the upstream SCR system may be referred to simply as a "first" SCR system or as a "first-in-box" SCR system. In such embodiments, a first temperature sensor, a first $NO_x$ sensor, a first DEF injector, a first heater, a second temperature sensor, a first-in-box SCR system, a third temperature sensor, and a second $NO_x$ sensor can be referred to as a "first-in-box" portion of the exhaust after-treatment system, as they can be collectively located relatively near to the engine of the vehicle. Further, in such embodiments, a DOC component, a DPF, a second DEF injector, a fourth temperature sensor, a mixer, a second heater, a fifth temperature sensor, a "second-in-box" SCR system, a sixth temperature sensor, and a third $NO_x$ sensor can be referred to as a "second-in-box" portion of the exhaust after-treatment system, as they can be collectively located relatively far from the engine of the vehicle.

In further alternatives to the specific arrangement described with respect to FIG. 1, an exhaust after-treatment system can have all of the features of the exhaust after-treatment system 100, and perform in accordance with all of the methods described herein, except that both the upstream and the downstream SCR systems are underbody SCR systems. In such embodiments, the upstream SCR system may be referred to simply as a "first" SCR system or as a "first-in-box" SCR system. In such embodiments, a first temperature sensor, a first $NO_x$ sensor, a first DEF injector, a first heater, a second temperature sensor, a first-in-box SCR system, a third temperature sensor, and a second $NO_x$ sensor can be referred to as a "first-in-box" portion of the exhaust after-treatment system, as they can be collectively located relatively near to the engine of the vehicle. Further, in such embodiments, a DOC component, a DPF, a second DEF injector, a fourth temperature sensor, a mixer, a second heater, a fifth temperature sensor, a "second-in-box" SCR system, a sixth temperature sensor, and a third $NO_x$ sensor can be referred to as a "second-in-box" portion of the exhaust after-treatment system, as they can be collectively located relatively far from the engine of the vehicle.

The embodiments described herein provide closed-loop control of DEF dosing in SCR systems in exhaust after-treatment systems, particularly in heavy-duty and/or diesel trucks. Such closed-loop control can reduce variability in $NO_x$ levels throughout the system and improve operating efficiencies of the SCR systems. Such closed-loop control further allows operating efficiencies to approach theoretical maximum efficiencies while avoiding ammonia slip, using traditional $NO_x$ sensors, thereby eliminating or reducing the need for expensive components such as more specialized sensors and/or ammonia oxidation catalyst systems. Such closed-loop control can be advantageous when regulated $NO_x$ emission levels are relatively low or ultra-low.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
   operating a diesel engine of a heavy-duty truck such that the diesel engine generates an exhaust gas flow that enters an exhaust after-treatment system of the heavy-duty truck, the exhaust after-treatment system including a selective catalytic reduction system;
   measuring a level of NOx gases in the exhaust gas flow downstream of the selective catalytic reduction system;
   controlling a diesel exhaust fluid injector upstream of the selective catalytic reduction system to inject diesel exhaust fluid into the exhaust gas flow upstream of the selective catalytic reduction system at an injection rate that is based on the measured level of NOx gases;
   determining whether ammonia slip is occurring at the selective catalytic reduction system, including:
      adjusting the injection rate, thereby changing an ammonia-to-NOx ratio at the selective catalytic reduction system;
      measuring first levels of NOx gases in the exhaust gas flow upstream of the selective catalytic reduction system and second levels of NOx gases in the exhaust gas flow downstream of the selective catalytic reduction system as the ammonia-to-NOx ratio at the selective catalytic reduction system changes;
      determining a measured efficiency of the selective catalytic reduction system based on the measured first and second levels of NOx gases; and
      determining whether the measured efficiency is positively or negatively correlated with the changing ammonia-to-NOx ratio; and
   adjusting the injection rate based on whether ammonia slip is occurring at the selective catalytic reduction system.

2. The method of claim 1 wherein the selective catalytic reduction system is an underbody selective catalytic reduction system.

3. The method of claim 1 wherein the selective catalytic reduction system is a close-coupled selective catalytic reduction system.

4. The method of claim 3 wherein the injection rate is further based on a temperature of an underbody selective catalytic reduction system.

5. The method of claim 1 wherein the selective catalytic reduction system is an upstream selective catalytic reduction system, the diesel exhaust fluid injector is a first diesel exhaust fluid injector, and the method further comprises:
   measuring a level of NOx gases in the exhaust gas flow downstream of a downstream selective catalytic reduction system; and
   controlling a second diesel exhaust fluid injector downstream of the upstream selective catalytic reduction system and upstream of the downstream selective catalytic reduction system to inject diesel exhaust fluid into the exhaust gas flow downstream of the upstream selective catalytic reduction system and upstream of the downstream selective catalytic reduction system at an injection rate that is based on the measured level of NOx gases in the exhaust gas flow downstream of the downstream selective catalytic reduction system.

6. The method of claim 1, further comprising:
if it is concluded that ammonia slip is not occurring and the measured efficiency is less than a target efficiency, then increasing the injection rate;
if it is concluded that ammonia slip is not occurring and the measured efficiency is greater than the target efficiency, then decreasing the injection rate; and
if it is concluded that ammonia slip is occurring, then decreasing the injection rate.

7. A method, comprising:
injecting diesel exhaust fluid into an exhaust after-treatment system upstream of an upstream selective catalytic reduction system at a first injection rate;
measuring a first NOx level downstream of the upstream selective catalytic reduction system;
adjusting the first injection rate based on the measured first NOx level;
injecting diesel exhaust fluid into the exhaust after-treatment system downstream of the upstream selective catalytic reduction system and upstream of a downstream selective catalytic reduction system at a second injection rate;
measuring a second NOx level downstream of the downstream selective catalytic reduction system; and
adjusting the second injection rate based on the measured second NOx level downstream of the downstream selective catalytic reduction system.

8. A heavy-duty truck, comprising:
a diesel engine;
an exhaust after-treatment system having an upstream end and a downstream end opposite the upstream end, the upstream end coupled to the diesel engine, the exhaust after-treatment system including a selective catalytic reduction system; and
an electronic control unit configured to:
operate the diesel engine such that the diesel engine generates an exhaust gas flow that enters the exhaust after-treatment system;
record a measurement of a level of NOx gases in the exhaust gas flow downstream of the selective catalytic reduction system;
control a diesel exhaust fluid injector upstream of the selective catalytic reduction system to inject diesel exhaust fluid into the exhaust gas flow upstream of the selective catalytic reduction system at an injection rate that is based on the measured level of NOx gases;
adjust the injection rate, thereby changing an ammonia-to-NOx ratio at the selective catalytic reduction system;
record measurements of first levels of NOx gases in the exhaust gas flow upstream of the selective catalytic reduction system and second levels of NOx gases in the exhaust gas flow downstream of the selective catalytic reduction system as the ammonia-to-NOx ratio at the selective catalytic reduction system changes;
determine a measured efficiency of the selective catalytic reduction system based on the measured first and second levels of NOx gases;
determine whether the measured efficiency is positively or negatively correlated with the changing ammonia-to-NOx ratio to determine whether ammonia slip is occurring at the selective catalytic reduction system; and
adjust the injection rate based on whether ammonia slip is occurring at the selective catalytic reduction system.

9. The heavy-duty truck of claim 8, wherein the electronic control unit is further configured to:
if it is concluded that ammonia slip is not occurring and the measured efficiency is less than a target efficiency, then increase the injection rate;
if it is concluded that ammonia slip is not occurring and the measured efficiency is greater than the target efficiency, then decrease the injection rate; and
if it is concluded that ammonia slip is occurring, then decrease the injection rate.

* * * * *